United States Patent

[11] 3,598,482

[72] Inventor Wendell S. Miller
 1341 Comstock Ave., Los Angeles, Calif. 90024
[21] Appl. No. 620,864
[22] Filed Mar. 6, 1967
[45] Patented Aug. 10, 1971

[54] OPTICAL PROJECTION SYSTEM
 26 Claims, 10 Drawing Figs.
[52] U.S. Cl. ................................................. 353/98, 353/66
[51] Int. Cl. .................................................. G03b 21/28
[50] Field of Search ........................................ 353/40, 10, 65, 66, 81, 98, 99, 60, 38; 350/175, 288, 293, 296, 117, 125; 240/47

[56] References Cited
UNITED STATES PATENTS

| | | | |
|---|---|---|---|
| 3,446,916 | 5/1969 | Abel et al. | 350/293 X |
| 1,763,630 | 6/1930 | Hopkins | 350/296 |
| 2,529,664 | 11/1950 | Roysher | 353/99 |
| 2,819,649 | 1/1958 | McLeod et al. | 350/294 X |
| 2,860,557 | 11/1958 | Moore et al. | 350/294 X |
| 3,166,623 | 1/1965 | Waidelich | 350/175 S |
| 3,265,885 | 8/1966 | Porter | 240/47 |
| 3,340,765 | 9/1967 | Herriott | 353/38 |

FOREIGN PATENTS

| | | | |
|---|---|---|---|
| 404,104 | 1/1934 | Great Britain | 350/293 |

Primary Examiner—Harry N. Haroian
Attorney—William P. Green

ABSTRACT: An optical projector having a mirror which reflects light from a light source into a projection system, and which has an optical object formed on the reflective face of the mirror at a location to be projected as an image onto a screen. The mirror is preferably constructed to function as a light condenser, for directing light primarily into the projection system, and/or as a heat sink for conducting heat away from the optical object.

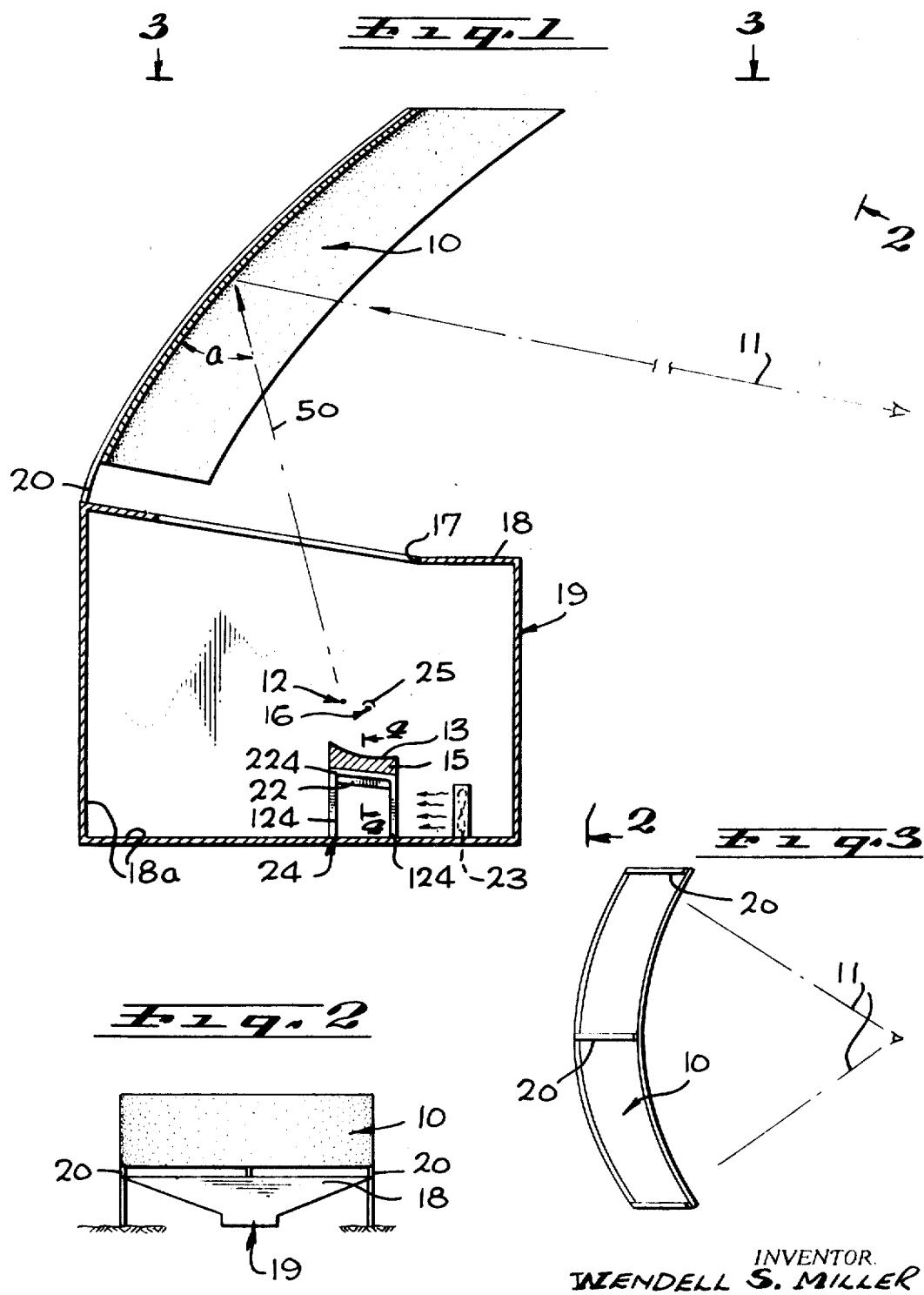

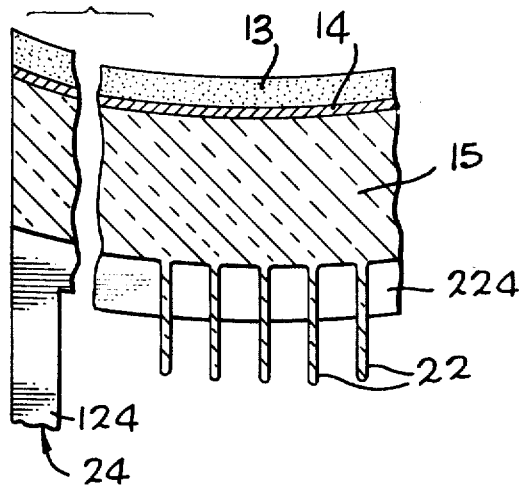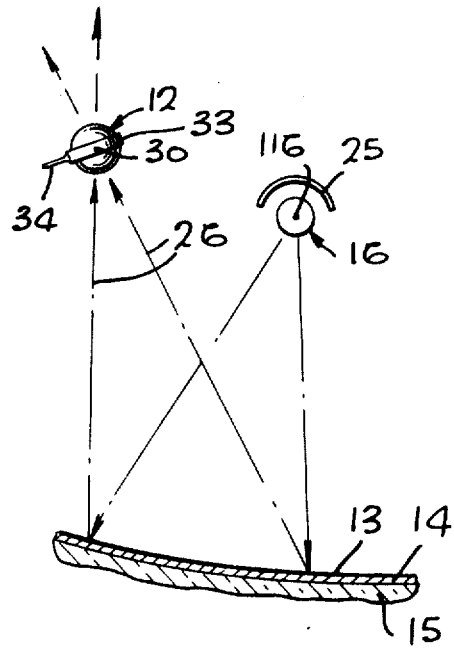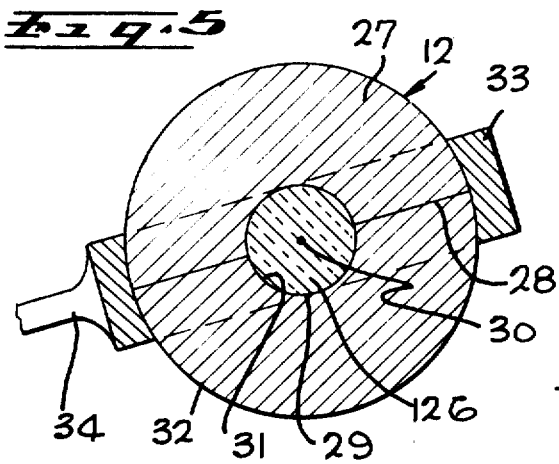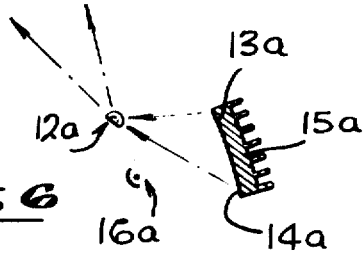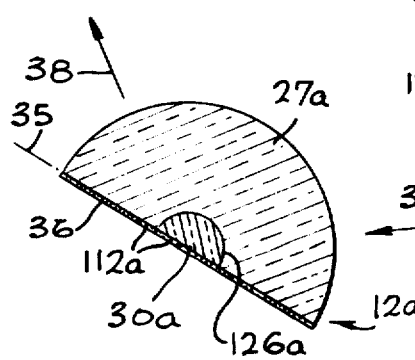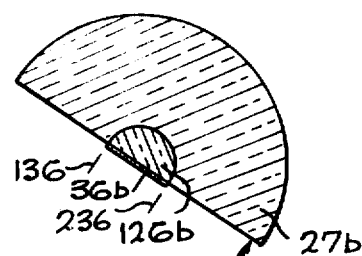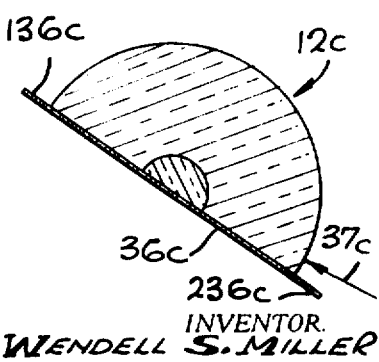

OPTICAL PROJECTION SYSTEM

BACKGROUND OF THE INVENTION

This invention relates to improved projector systems for projecting an image onto a screen for viewing.

Most conventional slide projectors are very limited as to the brightness and size of the image which they can project. This is true in part because any attempt to increase the intensity of the light source in such a projector beyond certain values may result in burning of or damage to the film; and further because any attempt to spread the projected image over too wide an area may destroy the contrast characteristics of the image, particularly in environments in which a substantial amount of ambient light is present. As a result, projectors have been excluded from use in many situations in which they might otherwise be employed, as for example in projecting advertising messages on large outdoor signs or the like.

SUMMARY OF THE INVENTION

A projector constructed in accordance with the present invention may be adapted for the projection of extremely high intensity and/or wide-angle images onto a screen, under very adverse lighting conditions, and in a manner enabling use of the projector for outdoor sign purposes or other situations for which conventional prior art projectors have been unsuited. Further, a projector embodying the invention may be employed to project such a high intensity wide-angle image continuously over a long period of time, and all without any danger of damaging the optical object by the heat associated with the light energy passing through that object. Additionally, the invention can be utilized in an "off-axis" system, that is, one in which the viewing screen is disposed at an inclination with respect to the main projection axis of the system.

Structurally, a projector embodying the invention includes a preferably localized source of light and a mirror having a reflective face which reflects light from the source into an associated projection system, which system then projects an image onto a screen. The optical object whose image is projected by the system is so formed and located as to extend along the reflective face of the mirror itself, substantially adjacent to that face. Desirably, the mirror is nonplanar and functions as a light condenser for maximizing the amount of light which is directed into the projection system. Further, the body of the mirror may be formed of highly heat-conductive material, preferably a metal, so that the mirror may serve as a heat sink, for conducting away a large portion of the heat produced by the light source in a manner preventing overheating of and damage to the optical object. The optical object is desirably a light-absorptive type of transparency, as distinguished from a light-scattering object. For best results, the projection system includes a concentric spherically curved lens, with the mirror and screen both being shaped as appropriate conicoids, desirably as an ellipsoid and a paraboloid respectively having coincident focii located at the center of curvature of the lens. In one form of the invention, the spherical lens has a reflective surface at one of its sides extending through the center of curvature of its spherical surface.

BRIEF DESCRIPTION OF THE DRAWING

Certain typical embodiments of the invention are illustrated in the accompanying drawings, in which:

FIG. 1 is a somewhat diagrammatic vertical section through a projection system constructed in accordance with the invention;

FIG. 2 is a reduced scale front view of the screen of FIG. 1, taken on line 2—2 of FIG. 1;

FIG. 3 is a reduced scale plan view taken on line 3—3 of FIG. 1;

FIG. 4 is a greatly enlarged vertical section taken on line 4—4 of FIG. 1;

FIG. 4a is an enlarged fragmentary representation of a portion of FIG. 1;

FIG. 5 is a vertical section through the projection lens of FIGS. 1 and 4a;

FIG. 6 is a view similar to a portion of FIG. 1, but showing a variational form of the invention;

FIG. 7 is a vertical section through the leans of the FIG. 6 arrangement; and

FIGS. 8 and 9 are views similar to FIG. 7 of two additional variational forms.

DESCRIPTION OF THE PREFERRED EMBODIMENTS

With reference first to FIG. 1, I have illustrated in that figure a system embodying the invention and adapted to be utilized as an outdoor advertising sign or the like. In this arrangement, the viewed image is projected onto a large screen 10 for viewing from a location to the right of the screen, as for instance along the line of sight designated 11 in FIG. 1. The image is projected upwardly by a projection system 12 desirably taking the form of a spherical projection lens. The optical object of the projection system takes the form of a thin emulsion 13 coating the upper reflective surface 14 of a condenser mirror body 15 (FIG. 4), with light being supplied by a high intensity localized light source 16. Lens 12 projects the image upwardly through an opening 17 of appropriate shape within a generally horizontal wall 18, whose upper surface, together with other surfaces 18a visible from the screen in the same general direction, are preferably painted or otherwise colored black to absorb light falling thereon, and thereby prevent light from reflecting off of that upper surface of wall 18 and surfaces 18a upwardly onto the screen in a manner interfering with the image projected onto the screen. Wall 18 may be supported by an appropriate housing 19 which may contain the light source, lens, optical object, and related parts, and which may also coact with appropriate columns 20 or the like in suitably supporting screen 10.

With particular reference to FIG. 4, the mirror body 15 may be formed of a highly heat-conductive material, such as a suitable metal, for example, copper, nickel, or aluminum. The upper surface of this mirror body is nonplanar and carries the correspondingly nonplanar concave specularly reflective coating 14 on its upper surface. This coating 14 may be any suitable material adapted to reflect light which impinges upon its upper surface, and more specifically may consist of a thin layer of aluminum evaporated on the metal, or a rhodium flash formed on the metal. The object layer 13 is coated on the upper surface of the mirror face 14, and follows the contour of that mirror surface. In the most preferred form, it is a thin photographic emulsion or transparency such as is employed in conventional color or black and white photographic film, and having colored or light and dark areas distributed in a manner forming a light-absorptive image. It is desirable that this layer modulate the projection light predominantly by absorption rather than scattering if a high degree of contrast retention and acuity of focus are to be obtained, since it is desirable to have the projection light pass only centrally through the projection lens. If this layer is to modulate the projection light predominantly by light scattering, additional stopping means around the desired central zone of the projection lens will be required, and certain of the wide-angle capabilities of the system described later will have to be relinquished.

In the system shown, light may pass downwardly through the object layer 13 and then be reflected back upwardly through substantially the same portion of the object layer of reflective coating 14, with different portions of the light spectrum being absorbed by different portions of the emulsion layer 13 in correspondence with the varying colors and brightnesses in the image to be projected.

Suitable means may be provided for cooling the mirror body 15, which by virtue of its heat-conductive characteristics functions as a heat sink for conducting heat away from reflective face 14 and the emulsion 13. For this purpose, the underside of mirror body 15 may be shaped to provide cooling fins 22, past which air or another cooling fluid may be circulated, as by a fan represented diagrammatically at 23. The mirror body 15 and its carried upper layers 13 and 14 may be removably supported in the illustrated FIG. 1 position by reception on an appropriate support stand designated 24, with this stand being suitably constructed to allow for the desired circulation of air or other cooling fluid past body 15. For this purpose, the stand may consist merely of four corner legs 124 supporting a horizontal generally rectangular frame 224 on which the body 15 may rest. Different mirror bodies carrying different transparencies on their upper surfaces may be substituted one for the other as desired, to change the subject matter projected on screen 10.

To enable body 15 to function effectively as a heat sink, this body should preferably have a high heat conductivity of at least about 5 calories /cm.-min. ° C. Under typical operating conditions with a transparency of 200 cm.$^2$ absorbing 1,000 watts, a temperature rise of less than 15° C. would be experienced, with an effective heat path of 1 cm. With allowance for the difference in temperature required at the fin-air interface, this is all a photographic transparency can stand.

The effective light source 16 is highly localized, and preferably is a very high intensity essentially single point source of light, such as a xenon arc lamp or a zirconium arc lamp. This lamp may have a spherically curved mirror 25 at its back side centered about the source of the light, for reflecting light which would otherwise be lost back through essentially the point of origin of the light, so that the light source 16 and reflector 25 function together to emit light from substantially a single point 116 toward reflective face 14 of the mirror. The localization of the light source will be seen to be of importance in providing the aperture stop of the system.

The shape of mirror face 14 is such as to enable this reflective surface to serve as a condenser mirror, acting to direct the light from point 116 primarily through projection lens 12 (desirably substantially entirely therethrough, and for best results substantially entirely through a central zone thereof). That is, the rays which emit from light source 16 toward reflective face 14 of the mirror are reflected by that face along converging paths as represented at 26, which paths and rays converge at substantially the center of the spherically curved lens 12. To accomplish this result, reflective surface 14 of the mirror preferably takes the form of a conicoid, that is, a surface of revolution of a conic section, and for best results this reflective face 14 is a prolate ellipsoid. Light source 16 is positioned at one of the focii of this ellipsoid, while the center 30 of spherically curved lens 12 is positioned at the other focus of the ellipsoid.

FIG. 5 illustrates in greatly enlarged form the spherical lens 12 of the FIG. 1 arrangement. To avoid damage to this lens by the highly concentrated light energy passing through its center, the lens may include a central element 126 formed of a first transparent substance which is capable of withstanding high temperatures, and having about it an outer concentric second transparent element 27. Element 126 may for best results be formed of quartz, while the outer element 27 may be formed of glass, and be constructed of two hemispherical halves meeting in a diametrical plane 28. The outer surface 29 of the quartz element 126 is spherically curved about the center 30 of the lens, and contacts a correspondingly spherical inner surface 31 of glass element 27. The outer surface 32 of glass element 27 is spherically curved about center 30, with the entire structure being mounted appropriately in fixed position in any desired manner, as by provision about the lens of a mounting ring 33 connected to an appropriate stationary support represented at 34.

As previously indicated, the light rays from point source 16 are reflected by mirror surface 14 on body 15 through the center 30 of quartz element 126 of the spherical lens system. Any slight deviation of this light energy from such a precisely central path will still leave the major portion, and desirably all, of that light energy passing through a central zone of the quartz portion of the lens, so that the maximum thermal stresses in the lens system occur in the quartz, which is of course able to withstand these stresses without damage.

I have determined that the transformation represented by the paraxial lens equation with fixed focal length carries one conic into another, coaxial and confocal thereto, if the center of projection is at the common focus. This property, together with the property of a spherically symmetrical lens in having a strictly constant focal length along any axis through its center, and the property of strict freedom from spherical aberration of a conic reflector with respect to its focii, make possible the extremely high efficiency of light utilization achieved by this device.

Lens 12 acts to focus the light rays which are directed through it in a manner projecting upwardly on screen 10 a focused image of the transparency or optical object layer 13 which is carried on the upper surface of reflective surface 14. Preferably, screen 10 is a conicoid, and for best results a paraboloid, since the chief rays will leave such a paraboloid screen in parallel relation for best viewing at distant positions. In some instances, however, it may be preferred to employ another surface which closely approximates such a paraboloid (for example a suitable hyperboloid or ellipsoid selected to closely approximate a paraboloid). The screen is so located and constructed that a focus of the paraboloid or other conicoid defined by the screen is positioned at substantially the location of lens 12, and desirably at substantially the center of that lens.

The viewing surface of the screen may be a simple smooth surface, such as would be presented for example by a layer of white paper, but preferably takes the form of a large number of specular lenticulations or facets, desirably consisting of segments of generally spherical shape. For optimum viewing, these facets should be spherical segments having a greater horizontal angle of subtense than vertical angle of subtense. For example, the facets may have a 70° horizontal angle, but only a 20° vertical angle. By the law of reflection, light reflected from the facets will have angles of flare twice as great, or 140° horizontally and 40 ° vertically. It is with such specular lenticulated screens, whose use in high ambient light systems is described in U.S. Pat. No. 2,974,565, that the desirability of the paraboloidal or ellipsoidal configuration is most pronounced. With such screens, each facet produces a viewing cone concentric with its chief ray, and the useful viewing field is determined by the intersection of all of these cones. The resulting viewing area is maximized by the use of a screen parabolic in section, and the closest viewing distance results from a screen elliptical in section.

In using the system of FIG. 1, an appropriately selected mirror body 15 is placed on support 24 carrying a desired optical object layer 13 (a light-absorptive transparency) on its upper surface, and light source 16 is then energized to illuminate the image carried by the object layer 13. Lens 12 focuses an image of the picture, writing or the like, carried by object layer 13, onto screen 10, so that this projected image may be viewed by a person or persons from along a viewing axis such as that represented at 11. The condensing action of specularly reflective layer or surface 14 causes substantially all of the light from source 16 which strikes that reflective surface to pass through the center of and be projected by lens 12, to thus maximize the brightness of the projected image. Also, the heat sink capacity of mirror body 15 enables that body to conduct heat away from the object layer 13, and thus prevent damage to that layer by the intense illumination from light source 16. As a result, the projector, though handling high intensities of light energy, may be left in operation for extremely long periods of time, to provide an outdoor or indoor sign capable of being viewed effectively under very high ambient lighting conditions. Any ambient light which is reflected by screen 10 downwardly toward walls 18 and 18a, is absorbed by the black surfaces of those walls and cannot be reflected back to the screen.

The spherical lens 12 has the advantage of providing a very wide angle of view without vignetting, and without a variation in aberrations throughout the field of view, and (when using a transparent absorptive object) with the speed of the lens system being determined only by the apparent angular size of the light source itself, so that there is substantial freedom from spherical aberration due to the narrow central zones employed, without a loss of light-collecting power in the lens system.

Since spherically symmetrical lens is free from all monochromatic off-axis aberrations save curvature of field (of which advantage is taken in this arrangement), and since the effect of spherical aberration is minimized by the condensing system prescribed which makes the light the light source the aperture stop, it is practical to utilize an unusually simple lens system for the light-conducting power and width of field obtained. In face the prescription of two radii and two refractive indices suffices to determine focal length and to completely eliminate third order spherical aberration and first order chromatic aberration. In practice the discrete nature of refractive index availability renders the last correction approximate.

FIGS. 6 and 7 show fragmentarily a portion of a variational system, which may be considered the same as that of FIGS. 1 to 5 except with respect to the structure of the spherically curved lens 12a, and the other related parts which are specifically illustrated in FIG. 6. In that figure, there is illustrated at 15a a mirror body which may be considered as essentially identical with that illustrated at 15 in FIG. 1, except as to its generally vertical rather than horizontal orientation. Body 15a carries a reflective face or layer 14a and an optical object 13a taking the form of an absorptive transparency coated on specularly reflective face 14a and corresponding to emulsion 13 of FIGS. 1 and 4. As in the first form of the invention, the reflective face 14a and transparency 13a are nonplanar and desirably ellipsoidal, with the point source of light 16a being located at one of the two focii of the ellipsoid. The center 30a of the spherical surfaces of lens system 12a is located at the other focus of the ellipsoid defined by layers 13a and 14a, with the lens acting to project an image upwardly in the same direction as in FIG. 1, and onto a screen such as that illustrated in FIG. 1.

FIG. 7 shows the structure of the lens 12a of FIG. 6, which lens is a hemisphere, having a first hemispherical element 126a formed of quartz, and having a second concentric hemispherical element 27a corresponding to half of the element 27 in FIG. 5, with the spherical surfaces of the two elements 126a and 27a being disposed about the center of curvature 30a of FIG. 7. The planar surfaces 112a at the underside of elements 126a and 27a lie in a common plane 35 which extends diametrically with respect to the two lens elements 126a and 27a, and which contains and passes through center 30a of the hemispheres. These surfaces 112a are coated with a layer 36 of specularly reflective material, such as mercury, which will reflect the light entering the lens from point source 16a, as for instance along line 37 of FIG. 7, in a manner causing that reflected light to pass upwardly, as for instance along the line 38 of FIG. 7, toward the screen 10 of FIG. 1. Thus, the reflective surface or coating 36 at the underside of the hemispherical lens 12a causes that lens to function in effect as a full spherical lens, to project and focus an image on the screen in the same manner discussed in connection with lens 12 of FIG. 1. However, the lens of FIG. 7 has the advantage of enabling the mirror body 15a and its carried coatings to be positioned in an upstanding manner as illustrated in FIG. 6, with the light source being located as illustrated also in that figure, in which condition a light source such as a xenon arc lamp may be so positioned that its tungsten electrodes may extend vertically, as is desirable for protecting such a lamp against damage. For optimum focusing of the image projected by lens 12a on a screen such as that shown at 10 in FIG. 1, the center of curvature 30a of lens 12a should desirably be located at the focus of the paraboloid defined by the screen, as in the first form of the invention.

It is noted that in both of the described systems (see FIG. 1), the screen 10 need not be, and preferably is not, disposed directly perpendicular to the main projection axis 50 of lens 12 (or 12a). Rather, the screen is desirably inclined at an oblique angle a with respect to the main projection axis. Thus, the present systems may have the advantage of so-called "off-axis" arrangements, to enable their use in instances in which "on-axis" projection is impractical or impossible. In off-axis installations, the transparency or object layer 13 or 13a on mirror body 15 or 15a may be appropriately predistorted to compensate for any keystone distortion produced by the inclination of the screen with respect to the projection axis.

As indicated above, it is desirable in most applications of the invention that the localized point source of light serve as the aperture stop for the entire optical system. However, there may be some instances in which such use of the light source as the effective aperture stop is not practical or possible, as for instance if a light-scattering type of optical object film is employed at 13 in FIG. 4 or 13a in FIG. 6. In that event, the lens system itself may be designed to serve as the aperture stop, in the manner illustrated in FIG. 8, in which the lens 12b is formed of two elements 27b and 126b identical with elements 27a and 126a of FIG. 7, but in which the reflective mirror surface 36b, corresponding to surface 36 of FIG. 7, covers only a small central circular portion of the flat side of the lens, (between the locations designated 136 and 236), to thus reflect toward the screen only light passing through the central zone of quartz element 126b.

FIG. 9 shows another form of the invention in which the planar mirror surface 36c extends across the entire flat underside of the two element lens system 12c, as in FIG. 7, and in addition projects radially outwardly beyond the extremity of lens 12c at 136c. For this purpose, the reflective surface 36c may be formed on a flat carrier plate 236c extending across the underside of the lens 12c, and projecting laterally therebeyond to carry the extended portion 136c of the mirror surface. This arrangement is helpful in instances in which the light from the object may approach lens 12c in a direction such as that illustrated at 37c, that is, at a very small angle to the plane of mirror surface 36c, with the result that some of this light may strike the outer periphery of the extended mirror surface 36c in a manner assuring maximum reflection of the light and maximum projection upwardly toward the screen.

Where the mirror which carries the object layer (for example mirror surface 14 of FIG. 4) has been described as preferably taking the form of a prolate ellipsoid, it is to be understood that this term includes broadly a sphere, as a degenerate form of ellipsoid. If a sphere is employed, the light source (16 of FIG. 4a) and the center of the projection lens (12 in FIG. 4a) may be offset equal amounts from the center of the sphere, and in diametrically opposite directions, and though this arrangement is not the optimum structure, it will produce a projected image of sufficiently high quality for most practical uses.

I claim:

1. Apparatus including a light-reflecting structure shaped essentially as a curved first conicoid of revolution, a screen shaped essentially as a curved second conicoid of revolution which optically has essentially the same axis of revolution as said first conicoid, means providing an illuminated optical representation following essentially the curvature of said conicoidal light-reflecting structure, and an optical projection system located essentially on said common axis of revolution of the two conicoids and constructed to view said optical representation which follows essentially the curvature of said reflecting structure and project an image thereof in focus on said screen.

2. Apparatus as recited in claim 1, in which said means include a source of light positioned to direct light toward said reflecting structure in a direction to be reflected thereby to said projection system.

3. Apparatus as recited in claim 1, in which said first conicoid is essentially an ellipsoid.

4. Apparatus as recited in claim 1, in which said second conicoid is shaped as or closely approximates a paraboloid.

5. Apparatus as recited in claim 1, in which said projection system includes a centrally projective lens structure.

6. Apparatus as recited in claim 1, in which said projection system includes a concentric spherically curved lens.

7. Apparatus as recited in claim 1, in which said projection system includes a lens having a surface at one side forming a portion of a sphere curved about a predetermined center and through which light passes into and out of the lens, said lens having a planar reflective surface at an opposite side extending essentially through said center and adapted to reflect light which has entered the lens through said spherical surface back out of the lens through said spherical surface.

8. Apparatus as recited in claim 1, in which said projection system includes a spherically curved lens having a center of curvature and including a first spherically curved body of quartz near said center and a second spherically curved body of glass farther from said center.

9. Apparatus as recited in claim 1, in which said projection system includes an inner lens element formed of a first material and having a spherical outer surface disposed about a predetermined center of curvature, and an outer lens element formed of a different material and located farther from said center than the inner element and having spherically curved inner and outer surfaces centered about said center of curvature.

10. Apparatus as recited in claim 9, in which said lens elements are essentially hemispherical and have planar reflective surfaces extending essentially through said center of curvature and adapted to reflect light toward said spherical surfaces of the lens elements.

11. Apparatus as recited in claim 1, in which said reflecting structure has a body of highly heat-conductive material adapted to conduct heat therefrom.

12. Apparatus as recited in claim 11, including means for circulating a cooling fluid past said heat-conductive material to cool it.

13. Apparatus as recited in claim 1, in which said first conicoid is essentially an ellipsoid, and said second conicoid is shaped as or closely approximates a paraboloid, said projection system including a concentric spherically curved lens having a center of curvature located essentially at a common focus of the two conicoids.

14. Apparatus as recited in claim 1, in which said optical projection system is located essentially at a focus of one of said conicoids.

15. Apparatus as recited in claim 1, in which said first and second conicoids have essentially a common focus, said optical projection system being located essentially at said common focus.

16. Apparatus including a light-reflecting structure shaped essentially as a curved first conicoid of revolution, a screen shaped essentially as a curved second conicoid of revolution which optically has essentially the same axis of revolution as said first conicoid means providing an illuminated optical representation following essentially the curvature of said conicoidal light-reflecting structure, and an optical projection system positioned at essentially a focus of said first coinicoid and constructed to view said optical representation and project an image thereof in focus onto said screen, said structure being constructed and positioned to reflect light of said optical representation primarily along converging paths into said projection system.

17. Apparatus as recited in claim 16, in which said means include a light source emitting light essentially from a second focus of said first conicoid onto said light-reflecting structure.

18. Apparatus as recited in claim 16, in which said means include markings formed on or closely adjacent, and following essentially the curvature of, said structure.

19. Apparatus as recited in claim 16, in which said first conicoid is essentially an ellipsoid.

20. Apparatus as recited in claim 16, in which said first conicoid is a conicoid of positive eccentricity.

21. Apparatus as recited in claim 16, in which said projection system includes a centrally projective lens structure.

22. Apparatus as recited in claim 16, in which said projection system includes a lens having a surface at one side forming a portion of a sphere curved about a predetermined center and through which light passes into and out of the lens, said lens having a planar reflective surface at an opposite side extending essentially through said center and adapted to reflect light which has entered the lens through said spherical surface back out of the lens through said spherical surface.

23. Apparatus as recited in claim 16, in which said first conicoid is an ellipsoid having said projection system at a first of its focii, said means including a light source emitting light from essentially the second focus of said ellipsoid onto said structure.

24. Apparatus as recited in claim 23, in which said projection system includes a concentric spherical lens having its center of curvature at said first focus.

25. Apparatus as recited in claim 16, in which said projection system includes a spherically curved lens having a center of curvature and including a first spherically curved body of quartz near said center and a second spherically curved body of glass farther from said center.

26. Apparatus as recited in claim 16, in which said first conicoid is an ellipsoid, said structure having a smoothly curving mirror face shaped as said ellipsoid, said means including light-absorptive markings formed on or closely proximate to said mirror face and following its ellipsoidal curvature, said means also including a light source located at the second focus of said ellipsoid and directing light onto said structure, said projection system being a centrally projective lens structure.